United States Patent [19]

Milne

[11] Patent Number: 4,815,015

[45] Date of Patent: Mar. 21, 1989

[54] APPARATUS FOR DETECTING THE PASSAGE OF MULTIPLE SUPERPOSED SHEETS ALONG A FEED PATH

[75] Inventor: Douglas L. Milne, Dundee, Scotland

[73] Assignee: NCR Corporation, Dayton, Ohio

[21] Appl. No.: 94,986

[22] Filed: Sep. 10, 1987

[30] Foreign Application Priority Data

Jun. 12, 1987 [GB] United Kingdom ............... 8713733

[51] Int. Cl.4 .......................... G01B 7/00; G01D 3/00
[52] U.S. Cl. ........................................ 364/563; 902/17
[58] Field of Search ............... 364/479, 563; 209/534, 209/551; 902/16, 17

[56] References Cited

U.S. PATENT DOCUMENTS

| 4,154,437 | 5/1979 | Butcheck et al. | 902/16 |
| 4,159,782 | 7/1979 | Swartzendruber | 902/16 |
| 4,168,058 | 9/1979 | Granzow et al. | 902/16 |
| 4,398,711 | 8/1983 | Horst et al. | 902/16 |
| 4,426,785 | 1/1984 | Loftus et al. | 902/16 |
| 4,462,587 | 7/1984 | Graef et al. | 902/16 |
| 4,491,929 | 1/1985 | Ikoma et al. | 364/563 |

FOREIGN PATENT DOCUMENTS 0186442 12/1985 European Pat. Off. .
WO82/01698 5/1982 PCT Int'l Appl. .
2001038 7/1978 United Kingdom .

Primary Examiner—Allen MacDonald
Attorney, Agent, or Firm—Wilbert Hawk, Jr.; Albert L. Sessler, Jr.

[57] ABSTRACT

An apparatus for detecting the passage of superposed sheets along a feed path includes first and second cooperating rollers (12, 14), the second roller (14) being movable away from the first roller (12) in response to the passage of a single or multiple sheet between the rollers (12, 14). The first roller (12) has a diameter twice that of the second roller (14). Voltage generating means (42) produces an output voltage which varies linearly with movement of the axis of the second roller relative to the axis of the first roller (12). This voltage is integrated over one complete revolution of the first roller (12) first with no sheet present and then with a single or multiple sheet passing between the rollers (12, 14) to produce first and second values respectively. The first value is subtracted from the second value to produce a third value on the basis of which the number of sheets corresponding to the second value is determined.

9 Claims, 7 Drawing Sheets

APPARATUS FOR DETECTING THE PASSAGE OF MULTIPLE SUPERPOSED SHEETS ALONG A FEED PATH

BACKGROUND OF THE INVENTION

This invention relates to an apparatus for detecting the passage of multiple superposed sheets along a feed path. The invention has application, for example, to an apparatus for detecting the passage of superposed currency notes in a cash dispensing mechanism of an automated teller machine (ATM).

In a cash dispensing mechanism, it is important to provide a simple and reliable means for detecting when a currency note has become superposed on another in a path of travel from a currency supply means to a note exit slot, since such superpositioning may produce an undesirable result such as the dispensing of an excessive amount of money. For convenience, two or more sheets or notes which have become disposed in a superposed relationship will hereinafter be referred to as a multiple sheet or multiple note.

One known type of apparatus for detecting the passage of multiple notes along a feed path employs a pair of gauging rollers between which notes are fed in operation. In the event of a multiple note (or an excess thickness note) passing between the rollers, the axis of one of the rollers is displaced by an amount such that a note rejecting means is actuated, actuation of the rejecting means causing the notes or note to be diverted into a reject hopper. A problem experienced with known apparatuses of this type is that such apparatus may not distinguish between multiple notes and a single note having a localized increase in thickness, brought about for example by a crease or fold in the note or by the attachment thereto of extraneous matter such as adhesive tape. As a result, there is a tendency for such apparatus to reject an excessive number of notes. The use of such apparatus in a cash dispensing mechanism of an ATM would tend to increase maintenance costs, since the rejection of an excessive number of notes would decrease the period of time between successive replenishments of the machine with currency notes.

An apparatus which is intended to overcome the aforementioned problem is disclosed for example in U.K. Patent Application No. 2001038A. This known apparatus employs a thickness sensor arranged to gauge a portion of a currency note and to generate a digital signal in response to note thickness, for example a logic 1 signal in response to a multiple note thickness and a logic 0 signal in response to a single note thickness. The digital output of the thickness sensor is applied to an integrator circuit which integrates this output over substantially the entire length of the gauged portion of the note. The output of the integrator circuit is compared with a reference signal in order to determine if the gauged note is a multiple note or a single note. Although this known apparatus is able to distinguish between a multiple note or a single note having localized areas of increased thickness that might be caused by dirt or creases, the apparatus is not able to determine the number of notes being sensed at any instant. For example, the apparatus is not able to distinguish between two superposed notes and three superposed notes.

According to the invention there is provided an apparatus for detecting the passage of superposed sheets along a feed path, comprising a frame for said apparatus first and second cooperating rollers, said first roller being secured on a shaft mounted in said frame and having a fixed axis of rotation, and the diameter of one of said rollers being equal to, or a multiple of, the diameter of the other roller; means for feeding sheets along said feed path between said rollers; means for mounting said second roller so that its axis is movable relative to that of said first roller and so that it is biased towards said first roller to enable said second roller to be displaced away from said first roller in response to a single or multiple sheet passing between said first and second rollers, said means for mounting including flexible anchor means mounted on said frame; a pivotally mounted rod substantially fixed in said anchor means at one end, on which rod said second roller is rotatably mounted; a support structure on said frame; and a connector member pivotally mounted on said support structure, coupled to an end of said rod remote from said one end; voltage generating means associated with said second roller and arranged to produce an output voltage which varies linearly with movement of the axis of said second roller toward or away from the axis of said first roller, said connector member being connected to said voltage generating means, whereby the passage of a single or multiple note between said first and second rollers brings about pivotal movement of said connector member, said pivotal movement causing a variation in the output voltage of said voltage generating means; integrator means coupled to said voltage generating means for integrating voltage values, to which said output voltage is applied in operation; data storage means coupled to said integrator means for storing values representing voltages; control means for causing said integrator means to store in said data storage means a first value representing the output voltage of said voltage generating means integrated over one complete revolution of said one of said rollers when no sheet is passing between said first and second rollers, and a second, value representing the output voltage of said generating means integrated over one complete revolution of said one of said rollers during which a single or multiple sheet passes between said first and second rollers; and data processing means coupled to said data storage means for subtracting said first value from said second value to produce a third value on the basis of which a determination is made of the number of sheets corresponding to said second value.

It should be understood that the ability of an apparatus in accordance with the invention to determine the number of sheets making up a detected multiple sheet is of importance, since when it is used in a cash dispensing mechanism, for example, it enables a multiple note to be counted as the appropriate number of notes and then dispensed to a customer. Alternatively, if a detected multiple note is diverted to a reject bin, the apparatus of the present invention would enable a record to be kept of the total number of notes which have been deposited in the reject bin.

It is accordingly an object of the present invention to provide an apparatus for detecting a multiple note, which apparatus is of simple construction and can determine the actual number of notes making up a detected multiple note.

With this and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
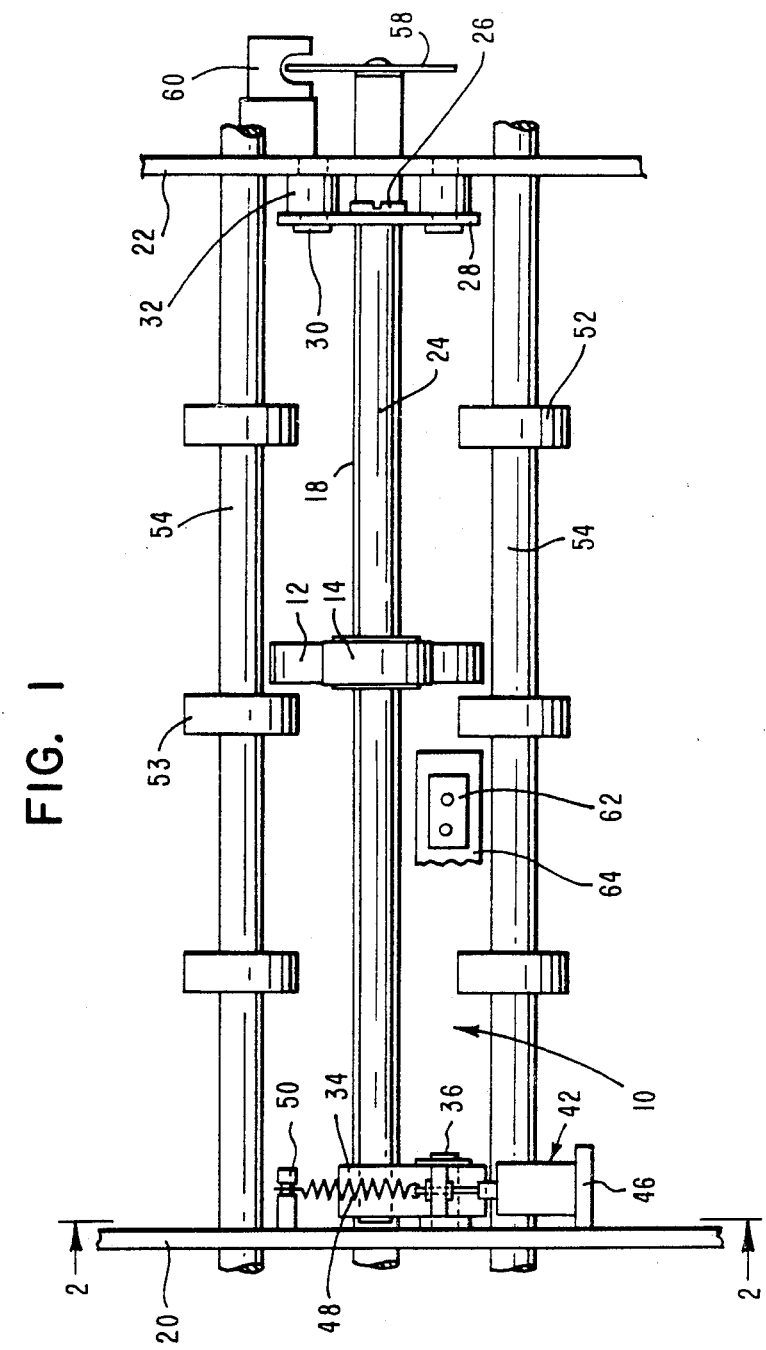
FIG. 1 is a front elevational view of a note sensing mechanism utilized in a multiple note detect apparatus in accordance with the present invention.
Figure 2:
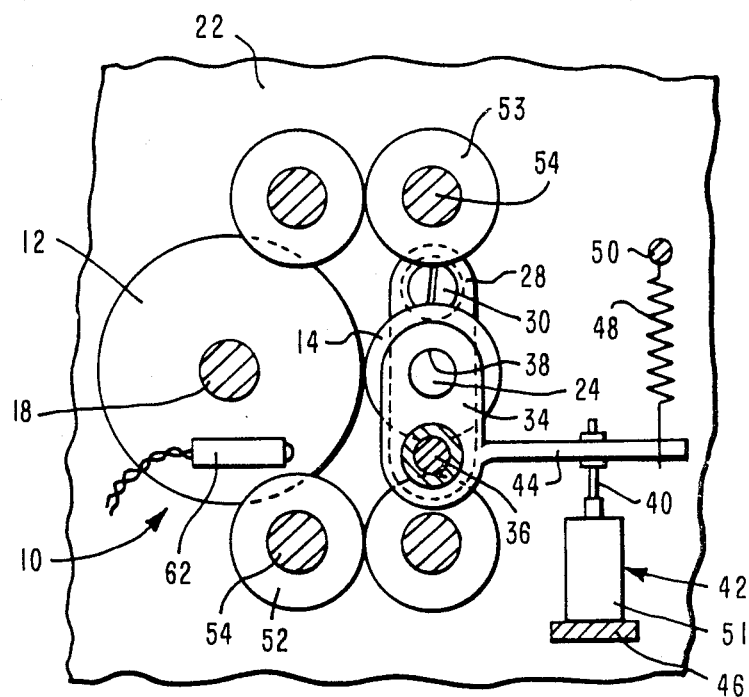
FIG. 2 is a part sectional side elevational view of the note sensing mechanism of FIG. 1 taken along the line 2—2 of FIG. 1.

Referring to FIGS. 1 and 2, a note sensing mechanism 10 of a multiple note detect apparatus in accordance with the invention includes a steel roller 12 having a fixed axis of rotation and a cooperating steel roller 14 having a movable axis of rotation, the diameter of the roller 12 being exactly twice that of the roller 14. As will be explained later, the roller 14 is resiliently urged into engagement with the roller 12, and currency notes 16 (see FIG. 3) of a predetermined denomination pass in operation between the rollers 12 and 14, with the short dimension (width) of each note 16 extending parallel to the axis of the roller 12.

The roller 12 is secured on a drive shaft 18 which extends between, and is rotatably mounted with respect to, a pair of side frame members 20 and 22, and the roller 14 is rotatably mounted on a rigid rod 24 which, in the absence of any currency note 16 between the rollers 12 and 14, extends parallel to the drive shaft 18. The roller 14 is caused to rotate in operation by virtue of its resilient engagement with the roller 12 or with a note passing between the rollers 12 and 14. The right hand end (reference to FIG. 1) of the rod 24 is secured by means of a screw 26 to a narrow plate 28 of plastics material which is disposed generally parallel to the side frame member 22. The ends of the plate 28 are secured to the member 22 by means of the bolts 30, the plate 28 being spaced from the inner surface of the member 22 by spacer members 32.

A connector member 34 is pivotally mounted on a stud 36 secured to the inner surface of the side frame member 20. That end of the rod 24 remote from the plate 28 is supported by the connector member 34, this end passing through, and being a tight fit with respect to, a circular aperture 38 formed in the connector member 34 above the stud 36. The connector member 34 is connected to a vertically extending armature 40 of a linear variable differential transformer (LVDT) 42 by means of an arm 44 which is formed integral with the connector member 34 and which extends therefrom in a generally horizontal direction. The LDVT 42 is mounted on a bracket 46 secured to the side frame member 20, and the free end of the arm 44 is connected by means of a spring 48 to a stud 50 secured to the member 20, the spring 48 serving to urge the assembly of the connector member 34 and the arm 44 in a counterclockwise direction (with reference to FIG. 2) about the stud 36. The plate 28 has a certain amount of inherent flexibility, and by virtue of this flexibility the rod 24 is pivotable to some extent about a point substantially at the center of the plate 28. Normally, the roller 14 is urged into engagement with the roller 12 under the action of the spring 48. Upon one or more currency notes passing between the rollers 12 and 14, pivotal movement of the rod 24 is brought about in a direction such that the left hand end (with reference to FIG. 1) of the rod 24 is moved away from the drive shaft 18. This pivotal movement of the rod 24 brings about a pivotal movement of the connector member 34 in a clockwise direction (with reference to FIG. 2) about the stud 36 against the action of the spring 48, and in turn this movement of the connector member 34 brings about a downward movement of the armature 40 of the LVDT 42 by means of the arm 44. Upon the currency note or notes leaving the nip of the rollers 12 and 14, the spring 48 returns the rod 24 to its home position with the roller 14 in engagement with the roller 12 and also moves the armature 40 in an upward direction back to its home position via the arm 44. It should be understood that the nature of the guidance of the armature 40 within the housing 51 of the LVDT 42 permits the angular movement of the arm 44 to be translated into up and down movement of the armature 40 over the small extent of the pivotal movement of the rod 24 encountered in operation.

Figure 6:
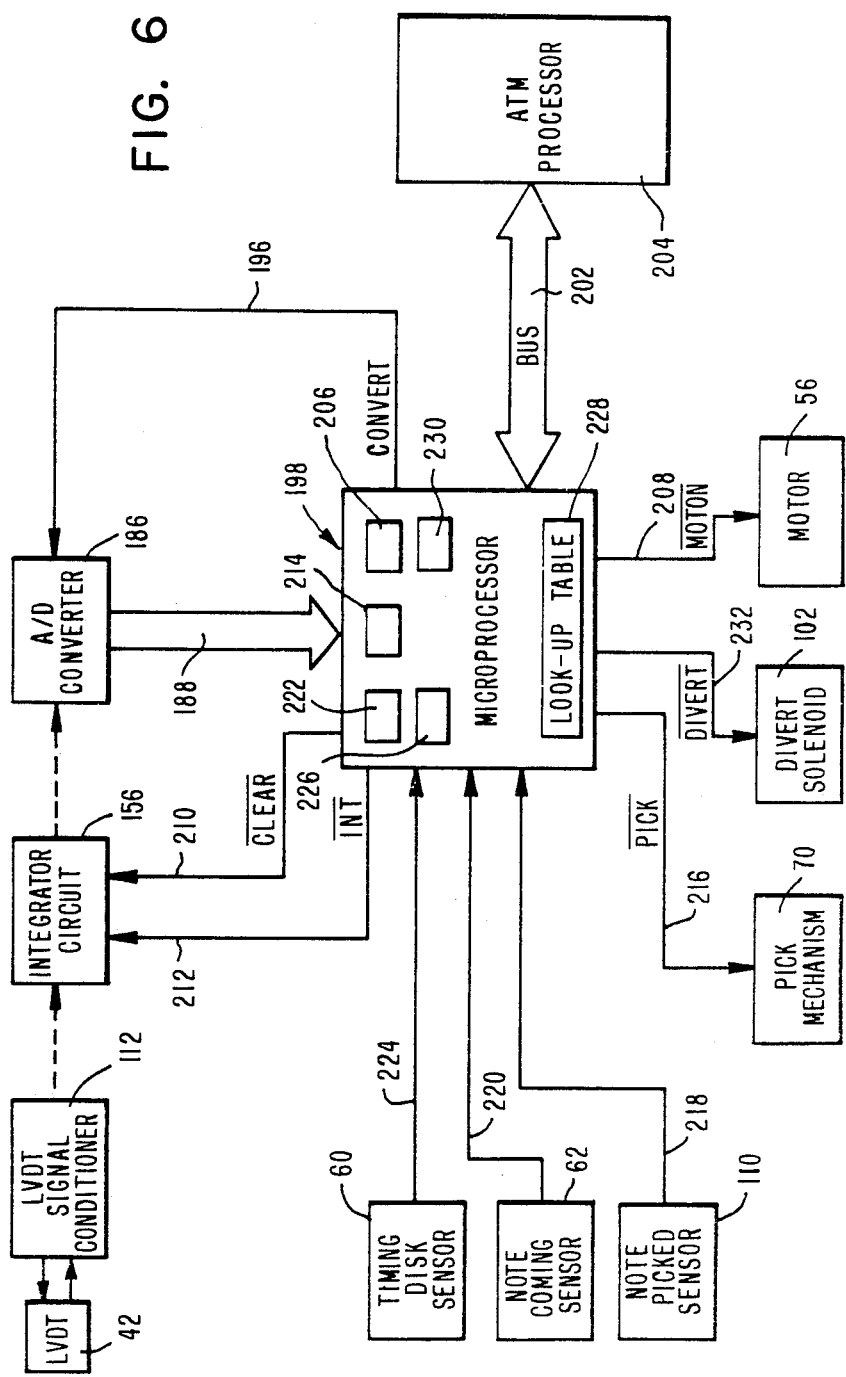
FIG. 6 is a block circuit diagram of the multiple note detect apparatus and associated parts of the cash dispensing mechanism.

Movement of currency notes in an upward direction between the rollers 12 and 14 is brought about by means of pairs of cooperating rubber feed rolls 52 and 53 mounted on shafts 54, the shafts 54 extending between, and being rotatably mounted with respect to, the side frame members 20 and 22. The feed rolls 52 and 53 and the drive shaft 18 for the roller 12 are driven via transmission means (not shown) by an electric motor 56 (FIG. 6). As shown in FIGS. 1 and 2, the feed rolls 52 are positioned beneath the rollers 12 and 14, and the feed rolls 53 are positioned above the rollers 12 and 14.

A timing disc 58 is secured to the end of the drive shaft 18 projecting beyond the side frame member 22, the disc 58 carrying a series of 36 radially extending marks (not seen) equally spaced around the axis of the shaft 18. The disc 58 cooperates with an optical sensor 60 mounted on the side frame member 22, and in operation the sensor 60 generates a series of timing pulses in response to the sensing of the marks carried by the disc 58. A further optical sensor 62, arranged to sense the approach of a currency note to the nip of the rollers 12 and 14, is mounted on a bracket 64 secured to the side frame member 20.

Figure 3:
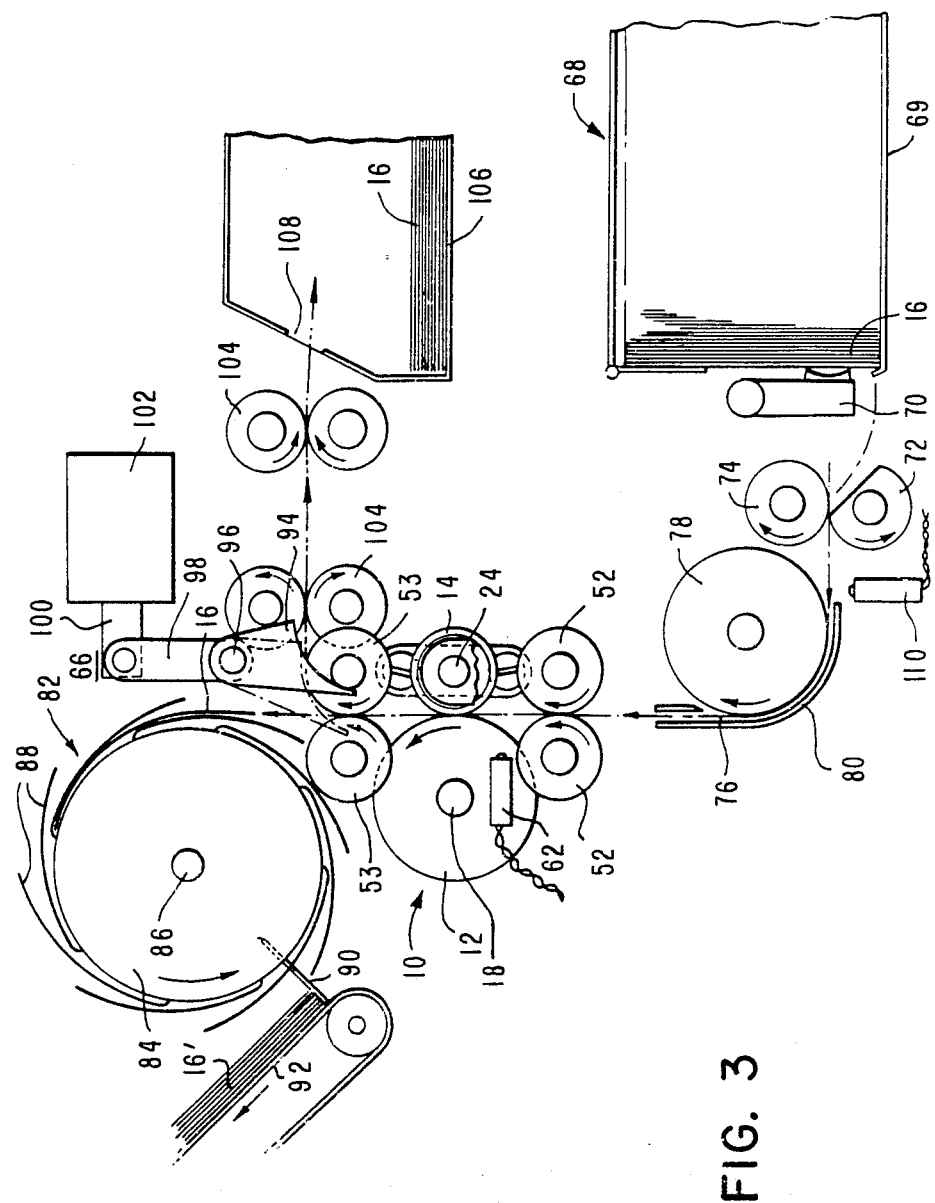
FIG. 3 is a schematic view of part of a cash dispensing mechanism incorporating the note sensing mechanism of FIGS. 1 and 2.

Referring now to FIG. 3, the note sensing mechanism 10 is included in a cash dispensing mechanism 66 of an ATM. The cash dispensing mechanism 66 includes a currency cassette 68 arranged to contain a stack of currency notes 16 of the abovementioned predetermined denomination with corresponding long edges thereof resting on the base 69 of the cassette 68. The cassette 68 is associated with a pick mechanism 70. When one or more currency notes 16 are to be dispensed from the cassette 68 in the course of a cash dispensing operation, the pick mechanism 70 is pivoted in a clockwise direction so as to draw the lower portion of the first note 16 in the stack out of the cassette 68 and into a position where the leading edge of this note is gripped between the curved periphery of pick roll means 72 of D-shaped cross-section and the periphery of cooperating roll means 74. The first note is fed out of the cassette 68 by the roll means 72 and 74, and is guided along a feed path 76 by roller 78 and guide means 80 until the leading edge of the note is gripped by the feed rolls 52.

Each currency note 16 extracted from the cassette 68 is fed by the feed rolls 52 to the nip of the rollers 12 and 14, and after passing between the rollers 12 and 14 the note 16 is fed in normal operation by the feed rolls 53 to a conventional stacking wheel 82 which is arranged to rotate continuously in operation in a counterclockwise direction. The stacking wheel 82 comprises a plurality of stacking plates 84 spaced apart in parallel relationship along the stacker steel shaft 86, each stacking plate 84 incorporating a series of curved tines 88. The stacking wheel 82 is associated with a stripper plate 90 which is in the form of a comb-like structure, and the tines 88 of each stacking plate 84 are arranged to pass between adjacent teeth of the stripper plate 90. In operation, each currency note 16 is fed by the feed rolls 53 to the stacking wheel 82 enters between adjacent tines 88 of the stacking plates 84, as shown in FIG. 3, and is carried partly around the axis of the stacking wheel 82, the note 16 being stripped from the stacking wheel 82, by the stripper plate 90 and being stacked against a normally stationary belt 92 with a long edge of the note 16 resting against the stripper plate 90. When a bundle of notes 16' (or possibly a single note only) to be dispensed to a user of the ATM in response to a cash withdrawal request has been stacked on the belt 92, the belt 92 is operated by a separate motor (not shown) so as to transport the bundle of notes 16' towards a cash delivery slot (not shown).

A divert gate 94 mounted on a shaft 96 is positioned above the note sensing mechanism 10 in association with the feed rolls 53. One end of an arm 98 is secured to the shaft 96, the other end of the arm 98 being pivotally coupled to an armature 100 associated with a solenoid 102. As will be explained later, the solenoid 102 is arranged to be energized in response to the multiple note detect apparatus detecting that an invalid single or multiple note has passed through the note sensing mechanism 10. The arrangement is such that with the solenoid 102 in a non-energized condition the divert gate 94 is in the position shown in solid outline in FIG. 3, out of the feed path 76 of currency notes 16 from the guide roller 78 to the stacking wheel 82. Upon the solenoid 102 being energized, the armature 100 causes the divert gate 94 to be pivoted via the arm 98 and shaft 96 in a clockwise direction into the position shown in chain outline in FIG. 3 in which the divert gate 94 is positioned in the feed path 76. With the divert gate 94 in this last-mentioned position, the divert gate 94 serves to guide invalid notes to feed rolls 104 which feed the notes to a reject bin 106, the notes being deposited into the bin through a slot 108.

In addition to the optical sensor 62 which is arranged to sense the approach of a currency note 16 to the nip of the rollers 12 and 14, the cash dispensing mechanism 66 also includes an optical sensor 110 which is arranged to sense when a currency note 16 has been extracted from the cassette 68 by the pick mechanism 70 and associated roll means 72 and 74.

Figure 4A:
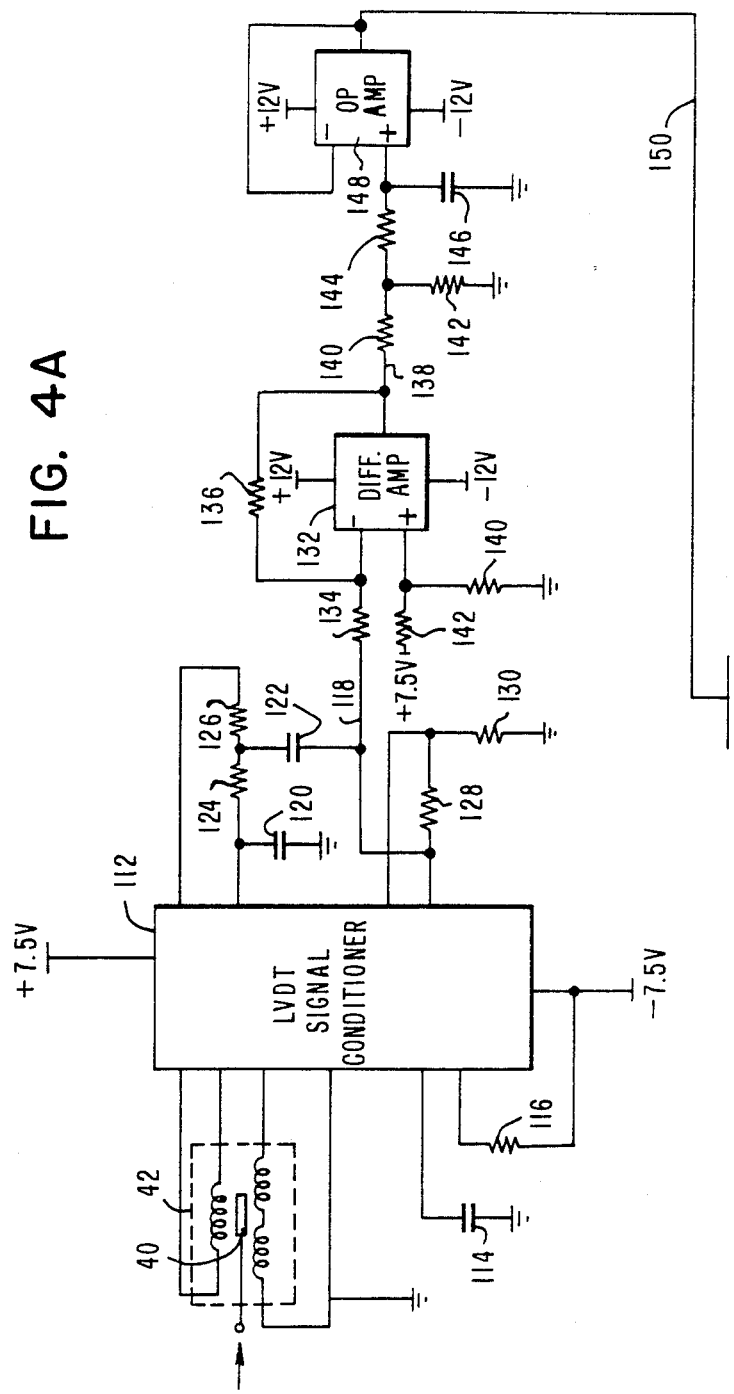
FIGS. 4A and 4B together form a circuit diagram of means for generating a reference integration value and a sensed note integration value utilized in the operation of the multiple note detect apparatus.
Figure 4B:
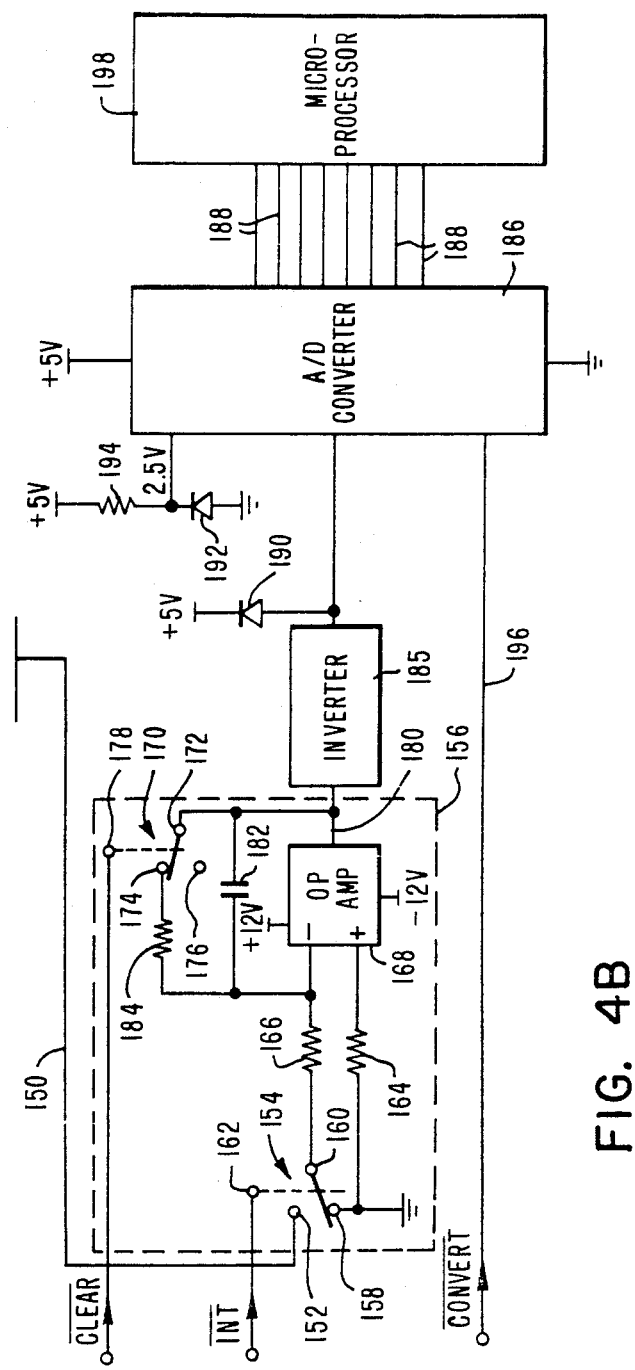

Referring now to FIGS. 4A and 4B, the LVDT 42 is connected to the LVDT signal conditioner 112 such as model NE 5521 available from Mullard Limited, London. As is known, the signal conditioner 112 is in the form of an integrated circuit incorporating a low distortion, amplitude stable sine wave oscillator with programmable frequency for driving the primary winding of the LVDT 42, a synchronous demodulator for converting the LVDT output amplitude and phase to position information and an output amplifier for providing amplification and filtering of the demodulated signal. A capacitor 114 and a resistor 116 set the modulation frequency of the primary winding of the LVDT 42 at 14 Khz. The output of the signal conditioner 112 appears on an output line 118, the demodulator output of the signal conditioner 112 being connected to the output line 118 via a low pass filter comprising capacitors 120 and 122 and resistors 124 and 126 connected as shown in FIG. 4A, and the gain of the output of the signal conditioner 112 being set by resistors 128 and 130. In the embodiment described, the output voltage appearing on line 118 changes from $+5$ volts to $-5$ volts as the armature 40 moves into the LVDT 42 from its uppermost position to its lowermost position.

The output line 118 of the signal conditioner 112 is connected to the negative terminal of a differential amplifier 132 via a resistor 134, this terminal being connected via a resistor 136 to the output line 138 of the amplifier 132. The positive terminal of the amplifier 132 is connected to ground via resistor 140 and is connected to a $+7.5$ volts supply via a resistor 142. The differential amplifier 132 serves to change the $+5$ volts to $-5$ volts output of the signal conditioner 112 into a 0 to $+10$ volts swing on the line 138. The line 138 is connected via a voltage divider comprising resistors 140 and 142 and an RC filter comprising a resistor 144 and a capacitor to the positive terminal of an operational amplifier 148, the negative terminal of which is connected to the output line 150 of the amplifier 148. The voltage divider 140, 142 serves to limit the output swing of the amplifier 132 to a 0 to $+5$ volts swing, and the combination of the RC filter 144, 146 and the operational amplifier 148 serves as a low pass filter to remove the effect of the low frequency mechanical oscillations of the LVDT armature 40 brought about by the return spring 48 (FIGS. 1 and 2). Thus, it will be appreciated that the signal appearing on the line 150 is a DC voltage between zero and $+5$ volts which varies linearly with movement of the armature 40 into and out of the LVDT 42 and which therefore also varies linearly with the angular movement of the axis of the roller 14 towards and away from the axis of the roller 12 (FIGS. 1 to 3).

The line 150 is connected to an input terminal 152 of an electronic switch 154 which forms part of a voltage integrator circuit 156. The switch 154 also includes a terminal 158 connected to ground, and a terminal 160 which is selectively connectable to the terminal 152 or to the terminal 158 under the control of a signal INT applied to a control terminal 162 of the switch 154. The terminals 158 and 160 are respectively connected via resistors 164 and 166 to the positive and negative input terminals of an operational amplifier 168. A second electronic switch 170 is included in the integrator circuit 156, the switch 170 including a terminal 172 selectively connectable to a terminal 174 or to a floating terminal 176 under the control of a signal CLEAR/ applied to a control terminal 178 of the switch 170. The negative input terminal of the operational amplifier 168 is connected to the output line 180 of the amplifier 168 via a capacitor 182. With the switch 170 in a closed condition, that is to say with the terminal 172 connected to the terminal 174, a resistor 184 is connected across the capacitor 182 for the purpose of discharging the capacitor 182. When the integrator circuit 156 is not in use, the terminal 160 is connected to the terminal 158 by the control signal INT/ being high, and the switch 170 is maintained in a closed condition by the control signal CLEAR/ being low, the output voltage appearing on the line 180 being zero at this time. When an integration operation of the voltage appearing on line 150 is to be performed, the switch 170 is opened by switching the terminal 172 into connection with the terminal 176 by the control signal CLEAR/ going high, and then the terminal 160 is switched into connection with the terminal 152 by the control signal INT/ going low. In the course of a voltage integration operation the control signal INT/ is held low for one complete revolution of the large roller 12, the integration operation being completed by the control signal INT/ again being set high. It will be appreciated that the integrated voltage $V_o$ generated by the integrator circuit 156 and stored in the capacitor 182 is given by the equation $$V_o = -\frac{1}{RC} \int_{t_1}^{t_2} V_i \, dt + K$$

where $V_i$ is the voltage appearing on line 150;
$t_1$ to $t_2$ is the length of the integration period;
R is the value of the resistor 166;
C is the value of the capacitor 182; and
K is a constant dependent on the initial position of the LVDT armature 40.

The voltage appearing on the output line 180 of the integrator circuit 156 is inverted by an inverter 185 and then applied to an analog to digital (A/D) converter 186 which serves to convert this voltage to an 8 bit digital word the bits of which respectively appear on the output lines 188 of the A/D converter 186. The output of the inverter 185 is connected via a diode 190 to a +5 volts supply so as to prevent any possible voltage spikes greater than 5 volts being fed into the A/D converter 186. Also a reference input terminal of the A/D converter 186 is connected to the junction between a diode 192 and a resistor 194 which are connected in series between ground and the +5 volts supply, this reference input serving to allow a 0 to +5 input voltage swing to be converted to 000 hex through to OFF hex on the output lines 188. A control line 196 is connected to the A/D converter 186, and the operation of the converter 186 is controlled by a control signal CONVERT/ applied to the line 196. An analog to digital conversion takes place in response to the signal CONVERT/ going low for a period of approximately 50 μs. The output lines 188 are connected to a microprocessor 198, such as an 8049 microprocessor available from the Intel Corporation, the microprocessor 198 being arranged to process the information appearing on the lines 188 in a manner to be described later.

The integrator circuit 156 is used to measure the cross sectional area of a single or multiple currency note 16 passing between the rollers 12 and 14 (FIGS. 1 to 3), that is to say an integration of the thickness of the note over its whole width. It should be understood that as the two rollers 12 and 14 rotate with no currency note passing between them the voltage output of the signal conditioner 112 will vary slightly due to various factors such as bearing wear and tolerances, dirt on the rollers 12 and 14 and roller eccentricity. Such voltage variation will hereinafter be referred to as roller noise. As previously mentioned, the diameter of the fixed axis roller 12 is exactly twice that of roller 14, so that during one revolution of the roller 12 there will be exactly two revolutions of the smaller roller 14. Thus, all the roller noise will be generated in one revolution of the fixed axis roller 12, and this noise will be substantially repetitive from one revolution to the next. At the start of a cash dispensing operation of the ATM and prior to the picking of any currency notes 16 from the currency cassette 68, a reference reading of the roller noise is taken by causing the integrator circuit 156 to effect a reference integration operation for one revolution of the roller 12, in the manner previously described.

Figure 5A:
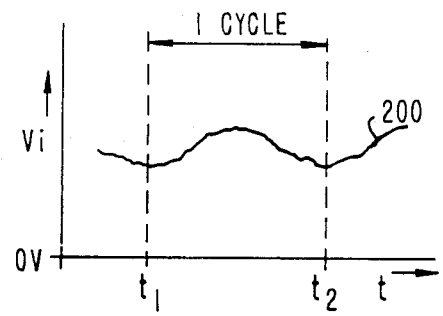
FIGS. 5A to 5D are graphical illustrations useful for explaining the operation of the multiple note detect apparatus.
Figure 5B:
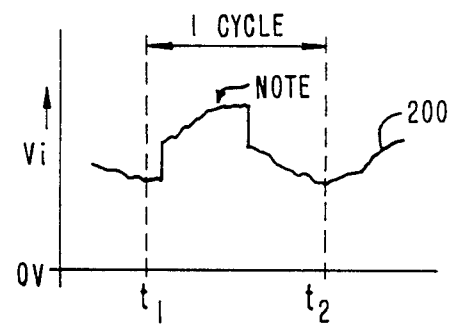

Referring to FIGS. 5A to 5D, the line 200 in each of these Figures represents the input voltage $V_i$ to the integrator circuit 156 appearing on the line 150, and the times $t_1$ and $t_2$ in each Figure respectively represent the times at which an integration operation commences and finishes under the control of the control signal INT. In FIG. 5A, the area under the line 200 between the times $t_1$ and $t_2$ represents a reference integration of the voltage V (with no currency note passing between the rollers 12 and 14) commencing at a first point in a revolution of the roller 12, the undulating configuration of the line 200 representing the roller noise. In FIG. 5B, the area under the line 200 between the times $t_1$ and $t_2$ represents an integration of the voltage V when a single or multiple currency note passes between the rollers 12 and 14 the integration commencing at the same point in a revolution of the roller 12 as in the case of the reference integration shown in FIG. 5A, and the note entering the nip of the rollers 12 and 14 after the time $t_1$ and leaving the nip prior to the time $t_2$. It will be appreciated that if the above-mentioned area in FIG. 5A is subtracted from the above-mentioned area in FIG. 5B, the resulting value will be proportional to the cross sectional area of single or multiple note which has passed between the rollers 12 and 14, and that the roller noise will have no effect on this resulting value. Also, it will be appreciated that the same resulting value will be obtained for two currency notes 16 passing between the rollers 12 and 14 in a fully superposed relationship as will be obtained for the same two notes 16 passing between the rollers 12 and 14 in a partially overlapping relationship. Similarly, the same resulting value will be obtained for a single note 16 as for the same note 16 folded about its long axis.

Figure 5C:
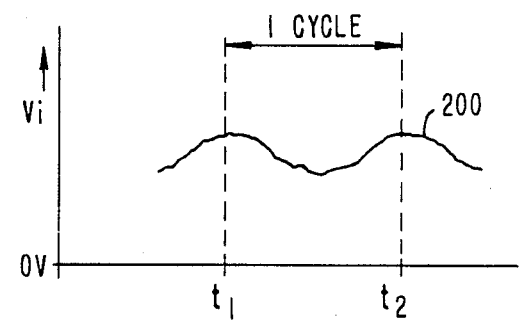
Figure 5D:
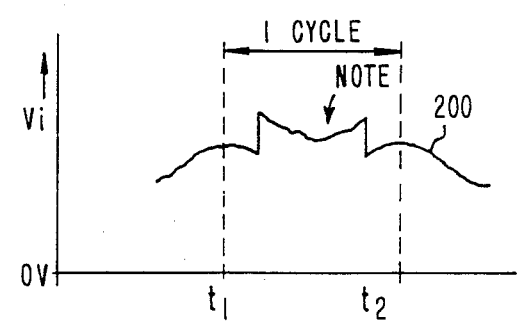

FIGS. 5C and 5D are respectively similar to FIGS. 5A and 5B, except that the integration operations illustrated in FIGS. 5C and 5D commence at a different point in a revolution of the roller 12 compared with the integration operations illustrated in FIGS. 5A and 5B. It should be understood that, provided an integration operation takes place over exactly one revolution of the roller 12, the result of the integration operation is not affected by the point in a revolution of the roller 12 at which the operation commences. Thus, the area in FIG. 5A under the line 200 between the times $t_1$ and $t_2$ is the same as the corresponding area in FIG. 5C, and the area in FIG. 5B under the line 200 between the times $t_1$ and $t_2$ is the same as the corresponding area in FIG. 5D.

The operation of the multiple note detect apparatus and of the associated parts of the cash dispensing mechanism 66 will now be described with additional reference to FIG. 6. This operation is controlled by the microprocessor 198 which is connected via an 8 bit bus 202 to the main ATM processor 204. When the main ATM processor 204 requests that a particular number of currency notes be dispensed by the cash dispensing mechanism 66 from the currency cassette 68 (FIG. 3), the microprocessor 198 stores this number in an internal memory location 206. The microprocessor 198 then switches on the motor 56 by setting a control signal MOTON/ on line 208 low. It should be understood that the motor 56 controls the operation of the drive shaft 18, the feed rolls 52, 53 and 104, the cooperating roll means 72, 74, the roller 78 and the stacking wheel 82.

The microprocessor 198 then causes the integrator circuit 156 to perform a reference integration operation, with no notes present between the rollers 12 and 14, for one full revolution of the fixed axis roller 12 under the control of the control signals CLEAR/ and INT/ applied to the integrator circuit 156 over lines 210 and 212. The reference voltage produced by the reference integration operation is digitized by the A/D converter 186 and stored by the microprocessor 198 in an internal memory location 214, the analog to digital conversion of the reference voltage being carried out in response to the control signal CONVERT/ on the line 196 being set low. Next, a currency note is caused to be picked up from the currency cassette 68 by the pick mechanism 70 in response to a signal PICK/ on line 216 being set low by the microprocessor 198. The picked note (which may be a single note or a multiple note) is detected by the sensor 110 which sends a signal to the microprocessor 198 over line 218 advising the microprocessor 198 that a note has been picked. In response to receipt of this signal, the microprocessor 198 restores the signal PICK on line 216 to a high condition and thereby deactivates the pick mechanism 70.

The picked currency note 16 is fed by the cooperating roll means 72, 74 (FIG. 3) along the feed path 76 to the feed rolls 52, and upon passing through the feed rolls 52 the leading edge of the picked note 16 is detected by the sensor 62. Thereupon, the sensor 62 sends a signal to the microprocessor 198 over line 220 advising the microprocessor 198 that a currency note 16 is approaching the note sensing mechanism 10. Upon receipt of this signal, the microprocessor 198 sets the signal CLEAR/ on the line 210 high so as to open the switch 170 (FIG. 4B) of the voltage integrator circuit 156, and then sets the signal INT/ on the line 212 low so as to connect the terminal 160 of the switch 154 to the terminal 152 and thereby initiates a thickness sensing voltage integration operation which continues for one full revolution of the fixed axis roller 12. After the thickness sensing voltage integration operation commences, the picked note 16 enters the nip of the rollers 12 and 14, and in normal operation the trailing edge of the picked note leaves the nip prior to the completion of the just mentioned full revolution of fixed axis roller 12. The voltage integration operation is terminated by the microprocessor 198 setting the signal INT/ on the line 212 high, after which the signal CONVERT/ on the line 196 goes low for 50 us to effect an analog to digital conversion. The microprocessor 198 then sets the signal CLEAR/ on the line 210 low, so as to close the switch 170 prior to the next note being picked from the currency cassette 68. As explained earlier, the voltage integration operation generates a voltage which is proportional to the cross sectional area of the note which has passed through the nip of the rollers 12 and 14. This voltage is converted to an 8 bit digital word by the A/D converter 186 in response to the microprocessor 198 applying the low control signal CONVERT/ to the A/D converter 186 on the line 196, this word representing a sensed note integration value which is stored by the microprocessor 198 in an internal memory location 222. The timing of the operation of the microprocessor 198, for example the time at which the signal INT/ is set high during each pick operation, is controlled by timing pulses generated by the timing disk sensor 60 and applied to the microprocessor 198 on line 224. The timing pulses are counted by a counter 226 included in the microprocessor 198, a count of 36, commencing at the time the signal INT on the line 212 is set low, indicating that one complete revolution of the fixed axis roller 12 has taken place. After the counter 226 has reached a count of 36, the count is reset to zero by the microprocessor 198.

After the sensed note integration value is stored in the memory location 222, the microprocessor 198 subtracts from this value the reference value stored in the memory location 214 and compares the result (which represents the cross sectional area of the picked single or multiple note) with the contents of a look-up table held in the internal memory location 228 of the microprocessor 198, in order to determine if possible the number of notes which have passed between the rollers 12 and 14. The contents of the look-up table in the memory location 228 comprises three discrete ranges of values respectively corresponding to 1, 2 and 3 notes. If the result of the subtraction operation falls within any one of these ranges, then the number of notes picked, corresponding to the relevant range, is stored in an internal memory location 230 of the microprocessor 198. It will be understood that, in a normal pick operation, the pick mechanism 70 picks a single note 16 from currency cassette 68 for feeding to the stacking wheel 82 (FIG. 3).

The microprocessor 198 then compares the number stored in the memory location 230 (i.e. the number of notes picked) with the number stored in the memory location 206 (i.e. the number of notes requested). If the number in location 230 is greater than that in location 206 then a multiple note has been picked comprising more notes than have been requested, and in this case the microprocessor 198 sends a signal DIVERT/ over line 232 to the divert solenoid 102 thereby activating the solenoid 102 so as to cause the divert gate 94 to be pivoted from its normal position shown in solid outline in FIG. 3 to the position shown in chain outline. Thus, in consequence of the signal DIVERT/ being sent to the divert solenoid 102, the picked multiple note is diverted into the reject bin 106 (FIG. 3); thereafter, the memory locations 222 and 230 are cleared and a further pick operation is initiated by virtue of the microprocessor 198 setting the signal PICK/ on line 216 low. If the number in location 230 is less than or equal to that in location 206, then the picked signal or multiple note is allowed to travel on the stacking wheel 82 for stacking on the belt 92 (FIG. 3), and the number in location 230 is subtracted from that in location 206, the result of the subtraction being overwritten into location 206. The location 206 now contains the number, if any, of notes still to be picked from the cassette 68 to be stacked on the belt 92. If the number now contained in location 206 is zero, then the microprocessor 198 switches off the motor 56 by setting the signal MOTON/ on line 208 high, the memory locations 206, 214, 222 and 230 are all cleared, and the belt 92 is operated so as to transport the stack of notes 16' positioned on the belt 92 towards the cash delivery port (not shown) and thereby complete the cash dispensing operation. If the number contained in the location 206 is not zero, then the memory locations 222 and 230 are cleared and the cash dispensing operation is continued by performing one or more additional pick operations as previously described, until such time as the number contained in the location 206 has been reduced to zero; when this stage is reached, the motor 56 is switched off, the memory locations 206, 214, 222 and 230 are all cleared and the belt 92 is operated as just described.

Prior to a cash dispensing operation taking place, the look-up table held in the memory location 228 is established by passing a number of single notes, a number of double notes (i.e. two superposed notes) and a number of triple notes (i.e. three superposed notes) through the note sensing mechanism 10 and recording the various sensed note integration values thus obtained. In a typical example of the look-up table, the range of values for a single note is 18 hex to 26 hex, the range of values for a double note is 38 hex to 46 hex, and the range of values for a triple note is 58 hex to 66 hex. If in the course of a pick operation a sensed note integration value is obtained which is between or outside the ranges making up the look-up table, for example a value between 26 hex and 38 hex, this value is invalid and the microprocessor 198 sends a signal DIVERT/ over the line 232 to the divert solenoid 102 so as to cause the picked single or multiple note which gave rise to this invalid value to be diverted into a reject bin 106. A picked note could give rise to an invalid integration value if, for example, the note is torn or if parts of the note are joined together by adhesive tape. The look-up table could be extended to include a range of values corresponding to 4 superposed notes, and possibly even a range of values corresponding to 5 superposed notes. However, it is extremely unlikely that as many as 4 or 5 notes would be picked in a single pick operation. Also, the look-up table could comprise just two ranges respectively corresponding to one and two notes.

It should be understood that the multiple note detect apparatus described above is able to count and pass on to the stacking wheel 82 overlapping double and triple notes whose overall length is greater that of a single note, provided that such overall length is not greater than the circumference of the fixed axis roller 12 less the distance between the sensor 62 and the nip of the rollers 12 and 14. In the present embodiment, overlapping double or triple notes are treated as invalid if their overall length corresponds to a count of the counter 226 of greater than 31, and, in the event of such count being exceeded with the overlapping notes continuing to be sensed by the sensor 62, the microprocessor 198 sends a signal DIVERT/ to the divert solenoid 102 so as to divert the overlapping notes to the rejection bin 106. In this case, no sensed note integration value is stored in the memory location 222, and a new pick operation is initiated without any clearing of the memory locations 222 and 230 being necessary.

The multiple note detect apparatus described above has the advantage that roller noise is compensated automatically by the utilization of the reference integration value generated at the beginning of each cash dispensing operation. This arrangement also allows the rollers 12 and 14 and the related bearings to be manufactured to a lower tolerance, thereby providing a reduction in manufacturing costs. Also, since picked double and triple notes can be read accurately and utilized in a cash dispensing operation (provided that the generated sensed note integration values fall within the relevant ranges in the look-up table in the memory location 228), the period of time between successive replenishments of the currency cassette 68 can be increased, thereby decreasing the downtime of the ATM of which the cash dispensing mechanism 66 forms a part. Further, since the cross sectional area of the part of a picked single or multiple note passing through the nip of the rollers 12 and 14 is determined rather than the thickness of the note, a folded single note can be accurately detected as being one note and overlapping double or triple notes can be accurately detected as two or three notes respectively (provided that their overall length does not exceed a certain limit), thereby reducing still further the number of notes that are rejected unnecessarily. Another advantage of the multiple note detect apparatus described above is that the utilization of spaced apart ranges of valid sensed note integration values in the look-up table in the memory location 228 enables mutilated notes to be rejected while substantially eliminating the risk of a picked double note being dispensed as a single note. A further advantage of the multiple note detect apparatus is that the microprocessor 198 has a short processing time since it is necessary to generate only one sensed note integration value for each note picked.

While the form of the invention shown and described herein is admirably adapted to fulfill the object primarily stated, it is to be understood that it is not intended to confine the invention to the form or embodiment disclosed herein, for it is susceptible of embodiment in various other forms within the scope of the appended claims.

What is claimed is:

1. An apparatus for detecting the passage of superposed sheets fed along a feed path, comprising:

a frame for said apparatus;

first and second cooperating rollers, said first roller being secured on a shaft mounted in said frame and having a fixed axis of rotation, and the diameter of one of said rollers being equal to, or a multiple of, the diameter of the other roller;

means for feeding sheets along said feed path between said rollers;

means for mounting said second roller so that its axis is movable relative to that of said first roller and so that it is biased toward said first roller to enable said second roller to be displaced away from said first roller in response to a single or multiple sheet passing between said first and second rollers, said means for mounting including flexible anchor means mounted on said frame; a pivotally mounted rod substantially fixed in said anchor means at one end, on which rod said second roller is rotatably mounted; a support structure on said frame; and a connector member pivotally mounted on said support structure, coupled to an end of said rod remote from said one end;

voltage generating means associated with said second roller and arranged to produce an output voltage which varies linearly with movement of the axis of said second roller toward or away from the axis of said first roller, said connector member being connected to said voltage generating means, whereby the passage of a single or multiple note between said first and second rollers brings about pivotal movement of said connector member, said pivotal movement causing a variation in the output voltage of said voltage generating means;

integrator means coupled to said voltage generating means for integrating voltage values, to which said output voltage is applied in operation;

data storage means coupled to said integrator means for storing values representing voltages;

control means for causing said integrator means to store in said data storage means a first value representing the output voltage of said voltage generating means integrated over one complete revolution of said one of said rollers when no sheet is passing between said first and second rollers, and a second value representing the output voltage of said voltage generating means integrated over one complete revolution of said one of said rollers during which a single or multiple sheet passes between said first and second rollers; and data processing means coupled to said data storage means for subtracting said first value from said second value to produce a third value on the basis of which a determination is made of the number of sheets corresponding to said second value.

2. The apparatus of claim 1, wherein the diameter of said first roller is greater than that of said second roller.

3. The apparatus of claim 2, wherein the diameter of said first roller is twice that of said second roller.

4. The apparatus of claim 1, also including a linear variable differential transformer which forms part of said voltage generating means, said transformer having an armature which said connector member is coupled, pivotal movement of said connector member in operation bringing about movement of said armature so as to cause a change in the output voltage of said voltage generating means.

5. The apparatus of claim 1, wherein said data processing means is arranged to compare said third value with a plurality of discrete ranges of values which are contained in a look-up table and which respectively correspond to different numbers of sheets, each range being spaced from the other range or ranges.

6. The apparatus of claim 1, wherein said integrator means is in the form of a voltage integrator circuit including:

first electronic switch means operable to cause said integrator circuit to integrate the output of said voltage generating means for one complete revolution of said one of said rollers;

capacitor means arranged to store the integrated output of said voltage generating means at the completion of a voltage integration operation; and second electronic switch means operable to cause said capacitor means to be discharged prior to the commencement of a voltage integration operation.

7. The apparatus of claim 6, wherein said control means includes a timing member which is mounted on a drive shaft for said one of said rollers and which is in cooperative relationship with sensor means arranged to generate a series of timing pulses in response to rotation of said drive shaft, said timing pulses serving to control the timing of the operation of said first electronic switch means.

8. The apparatus of claim 7, also including:

sheet sensing means arranged to generate a first signal indicative of the presence of a single or multiple sheet about to enter the nip of said first and second rollers; and counting means arranged to commence a count of said timing pulses in response to the generation of said first signal, said data processing means being arranged to generate a second signal indicative of an invalid sheet in the event of the continued generation of said first signal when said counting means reaches a predetermined count, said second signal serving to cause the invalid sheet to be diverted to a container for rejected sheets.

9. The apparatus of claim 5, also including a container for rejected sheets, wherein said data processing means is arranged to generate a signal indicative that the relevant single or multiple sheet is invalid in the event that said third value is found not to lie within any of said ranges, said signal serving to cause the invalid sheet to be diverted to said container for rejected sheets.

* * * * *

UNITED STATES PATENT AND TRADEMARK OFFICE
CERTIFICATE OF CORRECTION

PATENT NO. : 4,815,015
DATED : March 21, 1989
INVENTOR(S) : Douglas L. Milne

It is certified that error appears in the above-identified patent and that said Letters Patent is hereby corrected as shown below:

Column 13, line 31, after the word "armature", insert --to--.

Signed and Sealed this

Twenty-sixth Day of September, 1989

Attest:

DONALD J. QUIGG

Attesting Officer

Commissioner of Patents and Trademarks